United States Patent
Singwi

(10) Patent No.: US 12,549,562 B2
(45) Date of Patent: Feb. 10, 2026

(54) LEASING A VIRTUAL COMPUTING SYSTEM INFRASTRUCTURE

(71) Applicant: Salesforce, Inc., San Francisco, CA (US)

(72) Inventor: Raunak Ravindra Singwi, Pune (IN)

(73) Assignee: Salesforce, Inc., San Francisco, CA (US)

( * ) Notice: Subject to any disclaimer, the term of this patent is extended or adjusted under 35 U.S.C. 154(b) by 149 days.

(21) Appl. No.: 18/153,245

(22) Filed: Jan. 11, 2023

(65) Prior Publication Data
US 2024/0236112 A1 Jul. 11, 2024

(51) Int. Cl.
*H04L 9/40* (2022.01)
*G06F 9/50* (2006.01)

(52) U.S. Cl.
CPC .......... *H04L 63/108* (2013.01); *G06F 9/5072* (2013.01); *G06F 2209/5014* (2013.01)

(58) Field of Classification Search
None
See application file for complete search history.

(56) References Cited

U.S. PATENT DOCUMENTS

| | | | |
|---|---|---|---|
| 8,694,400 B1* | 4/2014 | Certain ................. | G06Q 40/06 705/35 |
| 2013/0160145 A1* | 6/2013 | Henzie ............... | H04N 21/6334 726/29 |
| 2018/0324251 A1* | 11/2018 | Padmanabh .......... | H04L 67/306 |
| 2021/0352710 A1* | 11/2021 | Lu ......................... | H04L 5/0044 |
| 2024/0176668 A1* | 5/2024 | Fahlbusch ............. | G06F 9/5077 |

* cited by examiner

*Primary Examiner* — Farid Homayounmehr
*Assistant Examiner* — Suman Debnath
(74) *Attorney, Agent, or Firm* — Holland & Hart LLP

(57) ABSTRACT

Methods, systems, apparatuses, devices, and computer program products are described. A user may transmit a request to a computing resource management service for use of one of a set of resources managed by the computing resource management service. The user or the computing resource management service may select a computing resource from a set of available resources, which may be a subset of the set of resource. The computing management service may transmit a lease request to the selected computing resource to modify the access control parameters to allow the user access to the selected computing resource during a lease period and restrict access to other users during the lease period. Further, the computing resource management service may transmit an indication of the selected computing resource and the lease period to the user.

20 Claims, 11 Drawing Sheets

LEASING A VIRTUAL COMPUTING SYSTEM INFRASTRUCTURE

FIELD OF TECHNOLOGY

The present disclosure relates generally to database systems and data processing, and more specifically to leasing a virtual computing system infrastructure.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, multiple users (e.g., a team of user or developers) may use a virtual machine to test and deploy products. When testing or deploying products, if multiple users among the team have access to the virtual machine infrastructure at the same time, the users may individually access, use, and edit the virtual machine infrastructure. However, the other users may be unaware of the use or changes performed by the other users, which may cause system inconsistency, errors, or unusable systems.

DETAILED DESCRIPTION

Figure 1:
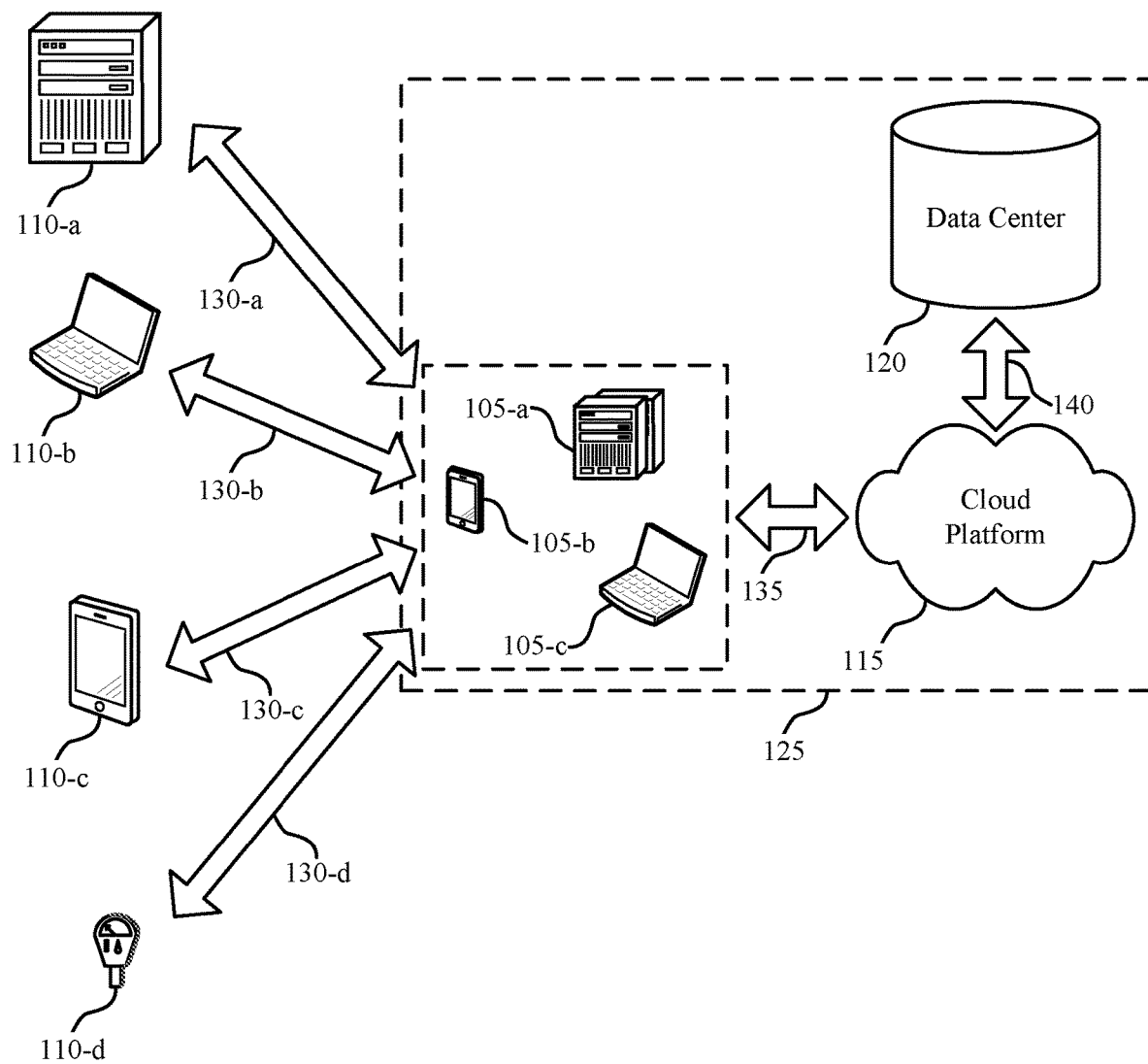
FIG. 1 illustrates an example of a data processing system that supports leasing a virtual computing system infrastructure in accordance with aspects of the present disclosure.

In some cases, teams or groups of users may share a limited set of computing resources (e.g., virtual machines environments) for testing. These virtual machine environments may be referred to sandbox environments. When cooperating with a large team or a team spread out geographically, it may be difficult to synchronize use of the computing resources. For example, to prevent team members from overriding changes or use of a virtual machine environment, the team members may manually coordinate with each other to determine who may use a computing resource for testing or production deployment. This process may be time consuming and inefficient especially for large teams with a large quantity of team members (e.g., users) in different time zones. If team members fail to synchronize the use of the computing resources, multiple users of the team may have access to the same computing resource at a same time instance. As such, the work product between the multiple team members may not be synchronized and some work may be overridden.

Techniques described herein support a computing resource management service that is configured to prevent users from overriding each other's changes to or use of the computing resources. Using the computing resource managing service, the users may request sole access to a computing resource for a set amount of time. During the set amount of time, the computing resource management service may lease a computing resource from a set of computing resources to the user for a lease period (e.g., the set amount of time). The computing resource management service may change the access control parameters of the computing resource so that the requesting user may have access to the computing resource (e.g., give read/write/execute (-rwx) permissions to the user). As such, the computing resource may restrict access to other users of the team during the lease period.

In some cases, the lease period may be preconfigured for a set amount of time (e.g., 24 hours). As such, the user with access to the computing resource may have sole access to the computing resource for the lease period. In some examples, a user may request to renew the lease of the computing resource to extend the lease period of the computing resource. Additionally, or alternatively, the user may release the computing resource before the lease period has expired allowing other users to gain access to the computing resource before the expiration of the lease period. In such cases, after the lease period has expired, the computing resource may change the access control parameters to restrict the user from accessing the computing resource (e.g., write/execute (-wx) permissions). As such, following the expiration of the computing resource lease, the release of the computing resource, or both, the computing resource management service may change the access control parameters so the user or another user may gain access to the computing resource for another lease period.

Aspects of the disclosure are initially described in the context of an environment supporting an on-demand database service. Additional aspects of the disclosure are described with reference to a computing architecture and a process flow. Aspects of the disclosure are further illustrated by and described with reference to apparatus diagrams, system diagrams, and flowcharts that relate to leasing a virtual computing system infrastructure.

FIG. 1 illustrates an example of a system 100 for cloud computing that supports leasing a virtual computing system infrastructure in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some cases, teams or groups of users (e.g., a group of users associated with a cloud client 105) of the system 100 may share a limited set of computing resources (e.g., virtual machines environments) use, such as for testing services in sandbox environments. When cooperating with a large team or a team spread out geographically, it may be difficult to synchronize use of the computing resources. For example, to prevent team members from overriding each other's changes or accessing a resource while another user is using the resource, the team members may manually coordinate with each other to determine who can use a computing resource for testing or production deployment. This process may be time consuming and inefficient especially for large teams with a large quantity of team members (e.g., users) in different time zones. If team members fail to synchronize the use of the computing resources, multiple users of the team may have access to the same computing resource at a same time instance. As such, the work product between the multiple team members may not be synchronized and some work or configurations may be overridden. For example, two users may use the same computing resource and may both edit variables of the computing resource at different time instances. When both users edit the variables of the computing resource, based on the timing of the edits, the execution of services may be impacted, and some work by user may be modified or lost. Such issues may result in critical race conditions which may cause unpredictable and undesirable behavior. As such, errors and bugs may be generated that critically impact a program, service, or the computing resource.

To prevent users from overriding other user work and to prevent the undesirable behavior at the computing resources, a computing resource management service described herein may be used for requesting access to and accessing a computing resource for a set amount of time. During the set amount of time, a computing resource management service may supporting leasing of a computing resource from a set of computing resources, to a user for a lease period (e.g., the set amount of time). The computing resource may change the access control parameters of the computing resource so a user or team member may have access and use computing resource (e.g., give read/write/execute (-rwx) permissions to the user). As such, the computing resource may restrict access to other users of the team during the lease period. For example, if a second user requests access to a leased computing resource, the second user may receive a message from the computing management service indicating that the computing resource is already leased. The second user may have read access (e.g., -r permissions) but may be restricted from writing to or executing commands on a computing resource already leased. As such, the computing resource management service may guarantee to users that any work completed on a computing resource during the leased period may not be overridden by other users. Such techniques may further increase the reliability of programs and increase the efficiency of testing or using the computing resources.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
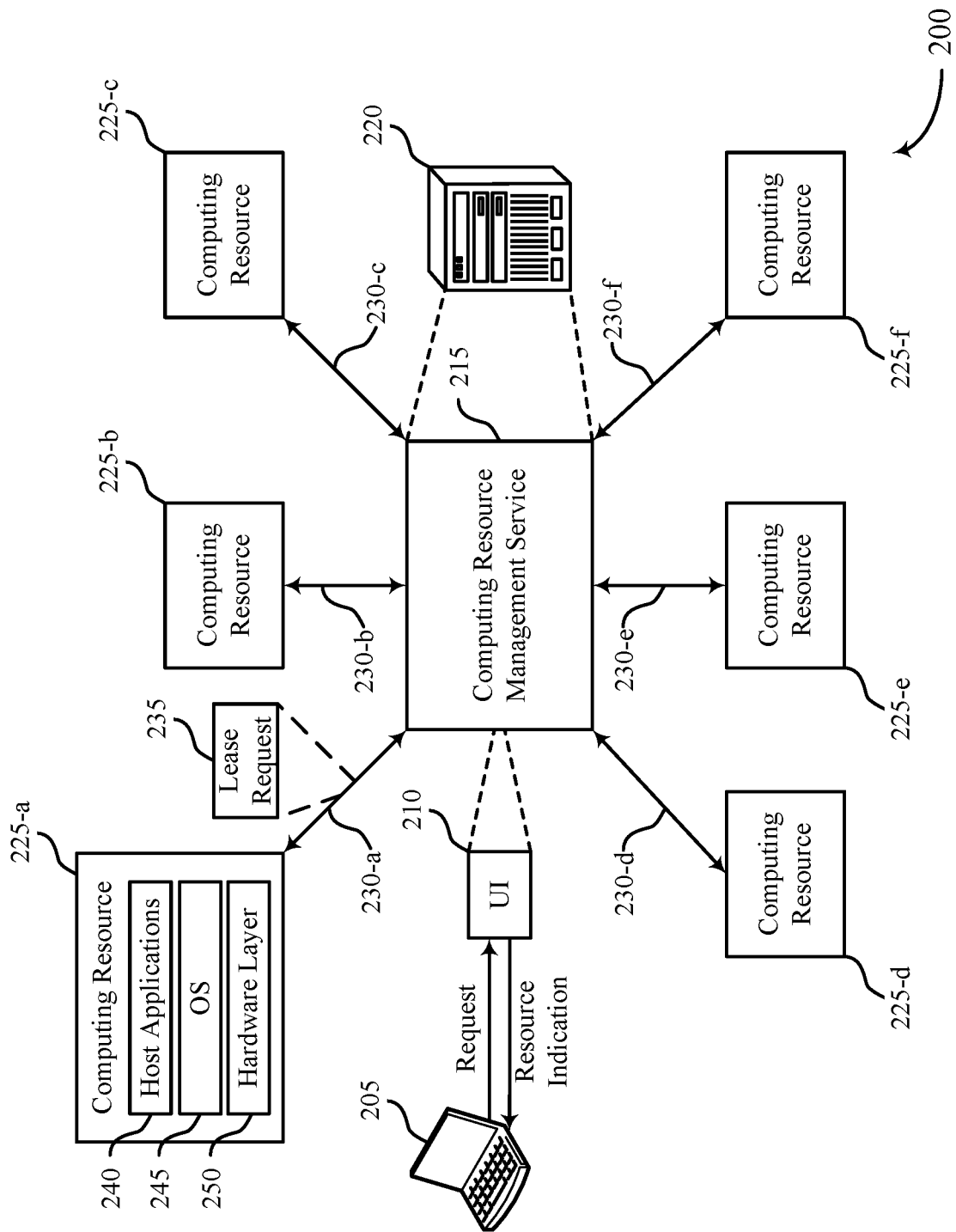
FIG. 2 illustrates an example of a computing architecture that supports leasing a virtual computing system infrastructure in accordance with aspects of the present disclosure.

FIG. 2 illustrates an example of a computing architecture 200 that supports leasing a virtual computing system infrastructure in accordance with aspects of the present disclosure. The computing architecture 200 includes a user device 205, a computing resource management service 215 with a user interface 210, and computing resources 225. In some cases, the computing resources 225 may include host applications, an operating system, and a hardware layer, such as host applications 240, operating system 245, and hardware layer 250 of computing resource 225-a. The computing resources 225 may be examples of a virtual machine environment. The computing resource management service 215 may be connected with the computing resources 225 via communication links 230. As described herein, the computing resource management service 215 may select a computing resource 225 based on a request from the user device 205 using the user interface 210 of the computing resource management service 215. The computing resource management service 215 may be supported or executed by one or more physical or logical computing systems, such as a server 220.

A user of the user device 205 may access a computing resource 225 for executing services or applications, testing services or applications (e.g., the computing resource 225 is a sandbox environment). In some cases, the user may be part of a team with access to a limited quantity of computing resources 225 (e.g., a computing resource 225-a, a computing resource 225-b, a computing resource 225-c, a computing resource 225-d, a computing resource 225-e, and a computing resource 225-f) that may be shared among the team. As such, for the user to use a computing resource (e.g., the computing resource 225-a) the team may ensure no other user among the team is using the computing resource 225-a. If two or more users use the computing resource 225-a at the same time, aspects of the computing resource 225-a may be overridden, errors or bugs may occur in execution of an application or service, and/or race conditions may occur. A race condition may be a situation in which a computing system (e.g., the computing resource 225-a) attempts to perform two or more operations simultaneously instead of sequentially. For example, two services (executed by two different users) read a value of a variable or parameter of the computing resource 225-a at a same time, and one of the services may change the value of variable or parameter the computing resource 225-a. In this case, the first service and the second service may read in the value of the variable or parameter at the same time and whichever user finishes executing their process last may override the result of the other user. For example, the first service and the second service may read in a variable of the computing resource 225-a equaling 10, and the first service may add 10 to the variable and may wait to perform another process before returning the result of the addition (e.g., 20) to the variable. During this time, the second service may subtract five from the variable of the computing resource 225-a and return the result of the subtraction (e.g., five) back to the variable of the computing resource 225-a before the first user returns their result. Following performing any additional processes, the first service may return the result of their addition back to variable thereby overriding the subtraction result from the second service. As such, the result and current value of the variable may be equal to 20 which may cause errors for the second service. In some other cases, if the first service reads in the variable before the second service, the second user may read in the variable as a null value (e.g., the variable is empty and has no value). As such, a service reading the wrong or incorrect value of a variable may cause errors or bugs in programs created by the users.

To prevent such conditions or scenarios, each user may be limited to accessing the computing resource 225-a individually. In some cases, working with a large team of users or users spread out geographically across time zones, users may have to coordinate with the entire team manually to ensure sole access to the computing resource 225-a. However, such techniques may be inefficient and may not limit simultaneous or contemporaneous access by multiple users.

As such, techniques of the present disclosure describe a computing resource management service 215 that is configured to assign access to the computing resources 225 via requests from users via the user interface 210 supported by the computing resource management service 215. For example, the user at the user device 205 may request, at the user interface 210, access to the computing resource 225-a. If no users are actively using the computing resource 225-a, the computing resource management service 215 may transmit a lease request 235 to the computing resource 225-a via a communication link 230 (e.g., communication link 230-a). The lease request 235 may be configured to change the access control parameters of the computing resource 225-a to grant read (e.g., -r), write (e.g., -w), and/or execute (e.g., -x) permissions (e.g., -rwx permissions) to the user. In some cases, the default permissions for all users may be read permissions (e.g., -r permissions) and no user may be able to write to the computing resource 225-a or execute commands on the computing resource 225-a, unless the user has a lease for the computing resource 225-a via the computing resource management service 215. However, if there is another user that has access to the computing resource 225-a at the time of the lease request 235, the computing resource 225-a may deny the lease request 235 and indicate, via the user interface 210, that the computing resource 225-a is unavailable (e.g., the computing resource 225-a is subject to a lease by another user). As such, the computing resource management service 215 may transmit a message to the user at the user device 205 indicating a denial of the request for access to the computing resource 225-a.

When leasing the computing resource 225-a to a user, the computing resource management service 215 may configure a lease period for the user to have access to the computing resource 225-a. For example, the lease period may preconfigured and static (e.g., 24 hours), and the user may be able to write to the computing resource 225-a, execute commands on the computing resource 225-a, or otherwise access the computing resource 225-a for at least 24 hours without risk of another user overriding their work. In some cases, if the user wishes to extend their access to the computing resource 225-a the user may request to renew the lease of the computing resource 225-a for an additional lease period (e.g., an additional 24 hours) via the user interface 210. In such cases, the computing resource management service 215 may refrain from granting renewal requests of the lease of the computing resource 225-a until at least a portion (e.g., half) of the lease period has lapsed (e.g., 12 hours). Such process may prevent a user from requesting to renew the lease of the computing resource 225-a multiple times as soon as the user gains access to the computing resource 225-a, thereby unnecessarily preventing other users from gaining access to the computing resource 225-a for a relatively long period of time (e.g., several days).

Additionally, or alternatively, a user may give up or release a lease of a computing resource 225 prior to the lease expiring. For example, the user may complete or perform any necessary testing or computations on the computing resource 225-a prior to the expiration of the lease period and may release the lease and the access of the computing resource 225-a to allow other users to gain access to the computing resource 225-a at an earlier time. In such cases, when the lease period does expire or the user releases the lease to the computing resource 225-a, the computing resource management service 215 may transmit a message to the computing resource 225-a to change the access control parameters to remove writing and executing permissions for the user device 205. As such, the computing resource management service 215 may indicate to the user that the lease period of their access to the computing resource 225-a has expired or confirm that the lease period has been released and that the user may no longer have edit permissions (e.g., -wx permissions) to the computing resource 225-a.

The communication links 230 may represent communication endpoints and networks used by the computing resource management service 215 to change permissions to grant and limit access to computing resources 225. For example, the lease request 235 may be an example of an application programming interface (API) request that is configured to change the permissions at the computing resource 225 to grant access to a user and limit access to other users. After expiration of the lease period or release of the lease, another API request may be transmitted to change the permissions such that the user is limited from accessing the computing resources 225-a.

In some examples, two users may request access to the computing resource 225-a at the same time. As one user may access the computing resource 225-a at a given time, the computing resource management service 215 may determine which user should gain access to the 225-a based on a priority of users. For example, the server 220 and/or a database associated with the server 220 may have each user of a team stored with a priority level compared to the other users of the team. For example, the second user may be a team or project leader or a manager and may have the highest priority of all the users of the team. As such, the second user may be assigned the lease to the computing resource 225-a over the first user. In some cases, if the first user is denied access to the computing resource 225-a, the computing resource management service 215 may assign another computing resource 225 to the first user (e.g., the computing resource 225-b) with comparable or the corresponding resources needed by the first user.

In some cases, when a user requests to lease a computing resource 225, the user may select the computing resource 225 from a list of available computing resources 225 at the user interface 210 of the computing resource management service 215. The user may indicate which computing resource they would wish to gain access to in the initial request to the computing resource management service 215. Additionally, or alternatively, when a user requests to lease a computing resource 225, the computing resource management service 215 may randomly select the computing resource 225 (e.g., from available resources) to lease to the user. In such cases, the user may also view a list of the leased computing resources 225, a list of all the computing resources 225, or the list of the available computing resources 225. In the list of leased computing resources 225, each item may contain a lease identifier, a leaser identifier (e.g., a name, username, or user identifier), and a lease end time. The lease identifier may be used by the computing resource management service 215 to identify each lease between multiple users and multiple computing resources 225. The lease end time may be the time of the end of the lease period. Additionally, or alternatively, the list may include a lease beginning time to indicate when the lease to the computing resource 225 was initiated. In some cases, the time frame from the lease beginning time and the lease end time may be longer than 24 hours if the user has requested to renew the lease of the computing resource 225-a. In the list of available computing resource 225 or all the computing resources 225, the items of the list (e.g., the computing resources 225) may contain the infrastructure of the computing resource 225, a component, a type (e.g., a sandbox), a region, a name for the computing resource 225, and the identifier of the computing resource 225 which may be the same as the lease identifier included in the list of leased computing resources 225.

Using such process of the present disclosure, users may be able to guarantee access to a computing resource 225 and ensure no other user may access the computing resource 225 for the lease period. In some cases, the process of the present disclosure may be used to lease other shared resources between users of a team. For example, instead of giving all users of a team access to a program or resource, the team may have a set or resources which the users can lease for a period of time as needed. For example, a team of users may use a wide variety of programs needing a wide variety of licenses. In some cases, since not all the team members may not use all the programs, in effort to save money the team may buy or purchase a set of programs or licenses equal to less than the number of team members. As such, the team members may use such processes described herein to lease a license from the set of licenses to use for a lease period. Therefore, the techniques as described herein may allow a set of shared resources to be individually leased between users to prevent errors from occurring due to multiple users having access to the same resource. Thus, the techniques described herein may be used to manage access to physical computing resources (e.g., hardware, data storage), logical computing resources (e.g., virtual machines), applications, licenses, or any combination thereof. Further, as described herein, the computing resource management service 215 may maintain or otherwise document leased resources, used resources, available resources, users that have leased resources or are leasing resources, etc., and may provide a user interface or platform such that users and/or managers may view current, past, and future resource usage information.

Figure 3:
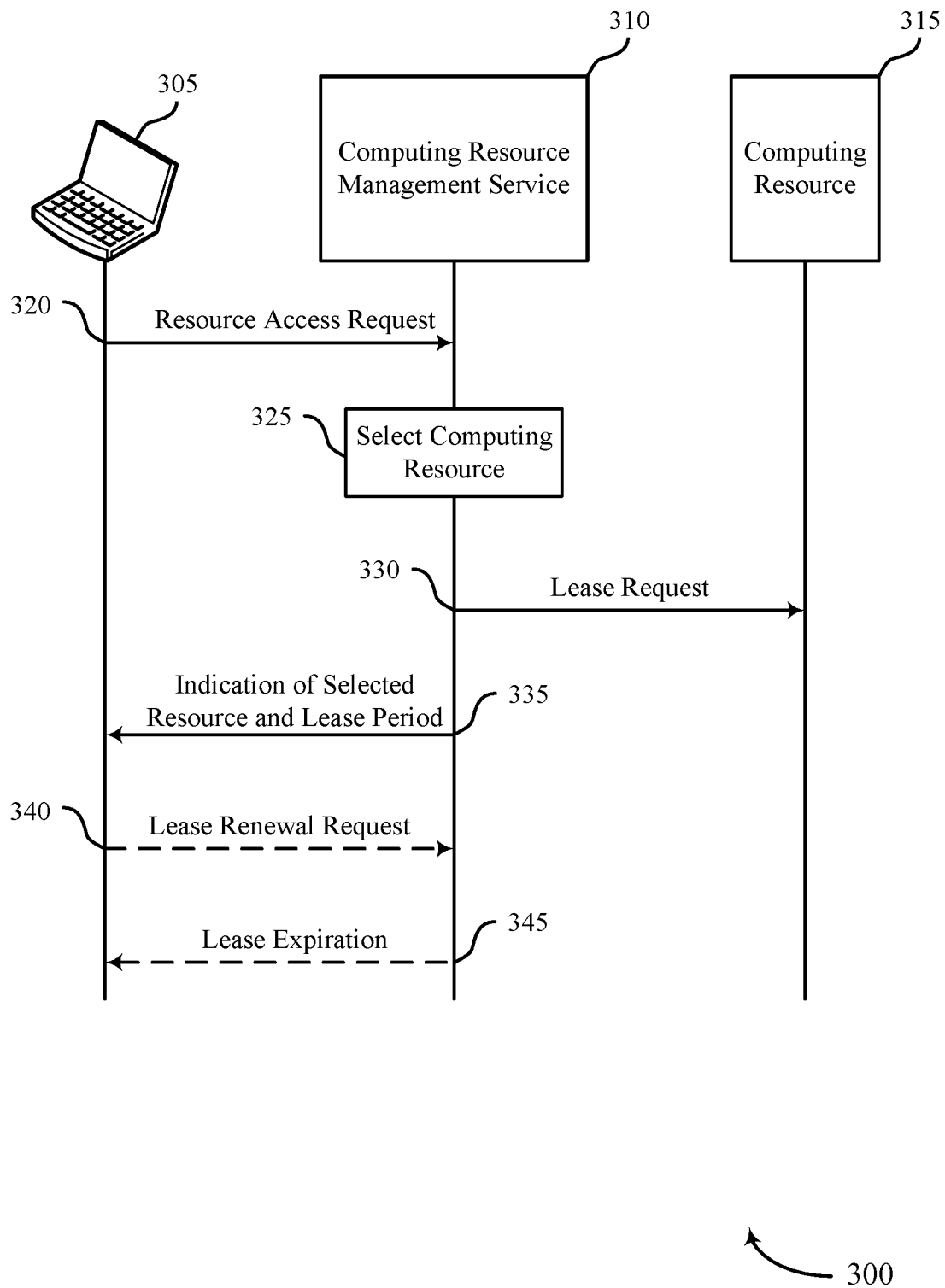
FIG. 3 illustrates an example of a process flow that supports leasing a virtual computing system infrastructure in accordance with aspects of the present disclosure.

FIG. 3 illustrates an example of a process flow 300 that supports leasing a virtual computing system infrastructure in accordance with aspects of the present disclosure. In some examples, the process flow 300 may implement or be implemented by the computing architecture 200. For example, the process flow 300 may include a user device 305, a computing resource management service 310, and a computing resource 315.

In the following description of the process flow 300, the operations between the user device 305, the computing resource management service 310, and the computing resource 315 may be performed in different orders or at different times. Some operations may also be left out of the process flow 300, or other operations may be added. Although the user device 305, the computing resource management service 310, and the computing resource 315 are shown performing the operations of the process flow 300, some aspects of some operations may also be performed devices or services.

At 320, computing resource management service 310 may receive a resource access request for use of one of a set of resources managed by the computing resource management service 310 from a user at the user device 305 via a user interface of the computing resource management service 310. In some cases, the computing resource management service 310 may receive an indication of a computing resource from a set of available computing resources, which may be a subset of the set of resources managed by the computing resource management service 310. Each computing resource of the set of computing resources may include a respective software stack (e.g., applications and operating system) and hardware stack (e.g., processors, memory, storage, communication facilities).

At 325, the computing resource management service 310 may select a computing resource from the set of available resources of a set of resources. The set of resource may include the subset of available resources and a subset of resources that may be designated or indicated as leased by another user. In some cases, the computing resource may be selected based on the indication of the computing resource in the resource access request at 320. In some other cases, the computing resource management service 310 may randomly select the computing resource from the subset of available resources.

At 330, the computing resource management service 310 may transmit a lease request to the computing resource 315 that may be configured to modify the access control parameters to the selected computing resource (e.g., the computing resource 315). The computing resource 315 may change the access control parameters (e.g., permission) to allow the user at the user device 305 to access the computing resource 315 during a lease period. During the lease period, the computing resource management service 310 and the computing resource 315 may restrict other users from accessing the computing resource 315. Following changing the access control parameters to grant access to the computing resource 315 to the user at the user device 305, at 335, the computing resource 315 may transmit to the user at the user device 305 an indication of the selected computing resource and the lease period. In some cases, the lease period may be a pre-configured duration of time set by the computing resource management service 310.

In some examples, the computing resource management service 310 may receive a resource access request for use of the selected computing resource (e.g., the computing resource 315) from a second user at the user interface of the computing resource management service 310. In such examples, the computing resource management service 310 may transmit an indication or message that the selected computing resource is already leased for a lease period to the second user via the user interface of the computing resource management service 310. In some cases, the indication or message may indicate the amount of time left in the lease, the current lease end time, or the user to which the lease of the selected computing resource is assigned.

At 340, in some examples, the computing resource 315 may receive a request to renew the lease period of the selected computing resource from the user at the user device 305. In some cases, based on receiving the request to renew the lease period, the computing resource 315 may determine that a pre-configured portion of the lease period (e.g., half of the lease period) for the selected computing resource has lapsed. As such, the computing resource management service 310 may update the lease period for the selected computing resource based on the determining the pre-configured portion of the lease period has lapsed. In some other cases, the computing resource 315 may determine that the pre-configured portion of the lease period for the selected computing resource has not lapsed. In such cases, the computing resource management service 310 may transmit to the user, via the user interface, an indication or message that the request to renew the lease period is denied.

In some other examples, the computing resource 315 may receive from the user at the user device 305 via the user interface of the computing resource 315 an indication or message to release the selected computing resource. The message or indication to release the selected computing resource may be received prior to an expiration of the lease period. In response, the computing resource management service 310 may transmit an indication to release the selected computing resource to the computing resource 315. As such, the computing resource management service 310 may transmit a message to the computing resource 315, and the request may be configured to modify the access control parameters to deny the user at the user device 305 access to the computing resource 315.

At 345, the computing resource management service 310 may transmit to the user at the user device 305 via the user interface of the computing resource 315 a message indicating the expiration of the lease period of the selected computing resource. As such, the computing resource management service 310 may transmit a message to the computing resource 315, and the request may be configured to modify the access control parameters to deny the user at the user device 305 access to the computing resource 315.

Figure 4:
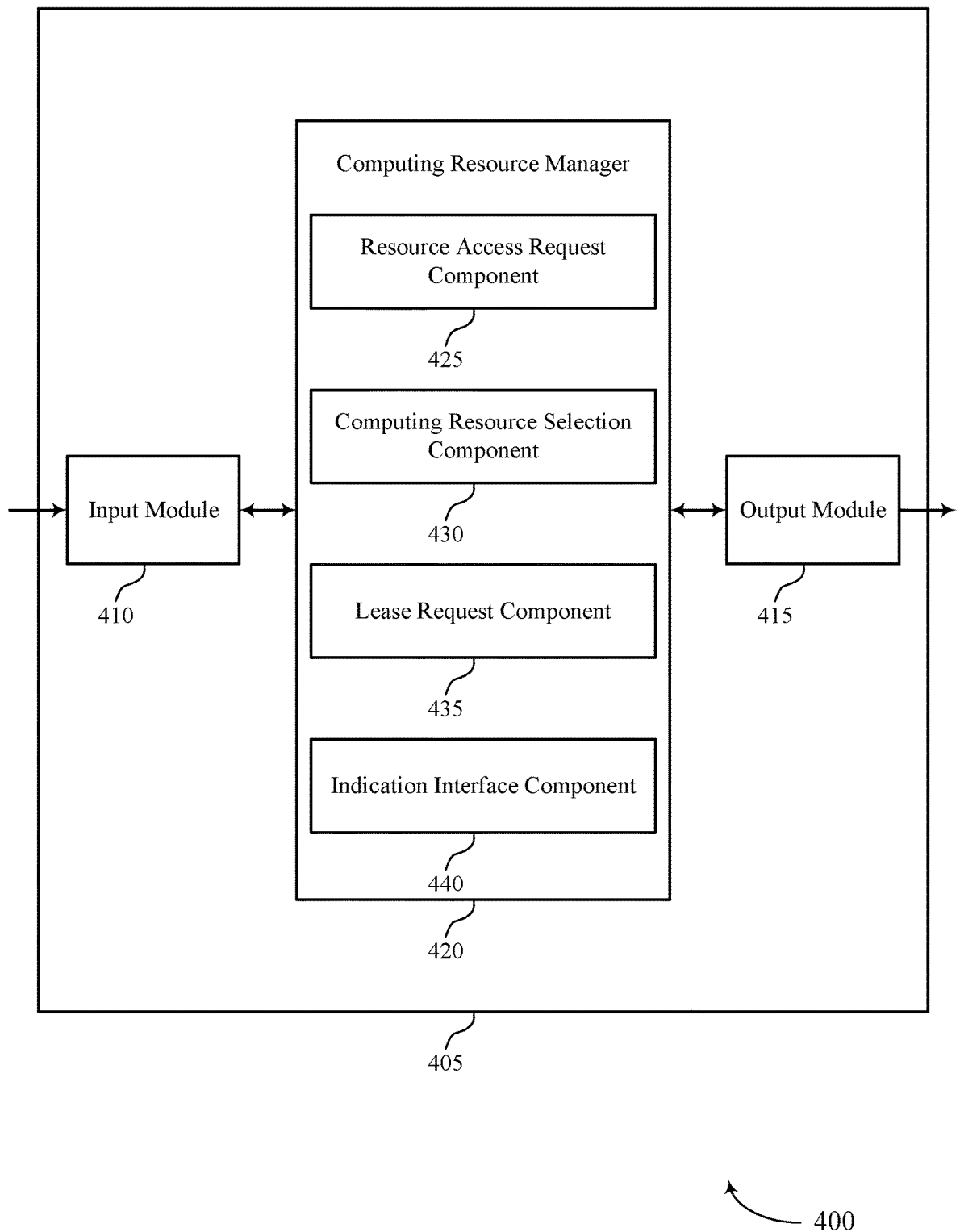
FIG. 4 illustrates a block diagram of an apparatus that supports leasing a virtual computing system infrastructure in accordance with aspects of the present disclosure.

FIG. 4 illustrates a block diagram 400 of a device 405 that supports leasing a virtual computing system infrastructure in accordance with aspects of the present disclosure. The device 405 may include an input module 410, an output module 415, and a computing resource manager 420. The device 405 may also include a processor. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the computing resource manager 420 to support leasing a virtual computing system infrastructure. In some cases, the input module 410 may be a component of an I/O controller 610 as described with reference to FIG. 6.

The output module 415 may manage output signals for the device 405. For example, the output module 415 may receive signals from other components of the device 405, such as the computing resource manager 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the computing resource manager 420 may include a resource access request component 425, a computing resource selection component 430, a lease request component 435, an indication interface component 440, or any combination thereof. In some examples, the computing resource manager 420, or various components thereof, may be configured to perform various operations (e.g., receiving, monitoring, transmitting) using or otherwise in cooperation with the input module 410, the output module 415, or both. For example, the computing resource manager 420 may receive information from the input module 410, send information to the output module 415, or be integrated in combination with the input module 410, the output module 415, or both to receive information, transmit information, or perform various other operations as described herein.

The computing resource manager 420 may support data processing in accordance with examples as disclosed herein. The resource access request component 425 may be used for receiving, from a user and at a user interface supported by a computing resource management service, a resource access request for use of one of a set of multiple resources managed by the computing resource management service. The computing resource selection component 430 may be used for selecting a computing resource from a set of available resources of the set of multiple resources, the set of multiple resources including the set of available resources and set of resources that are designated as leased by another user. The lease request component 435 may be used for transmitting, to the selected computing resource, a lease request that is configured to modify an access control parameter to allow the user access to the selected computing resource during a lease period and restrict other users from accessing the selected computing resource during the lease period. The indication interface component 440 may be used for transmitting, to the user via the user interface, an indication of the selected computing resource and the lease period.

Figure 5:
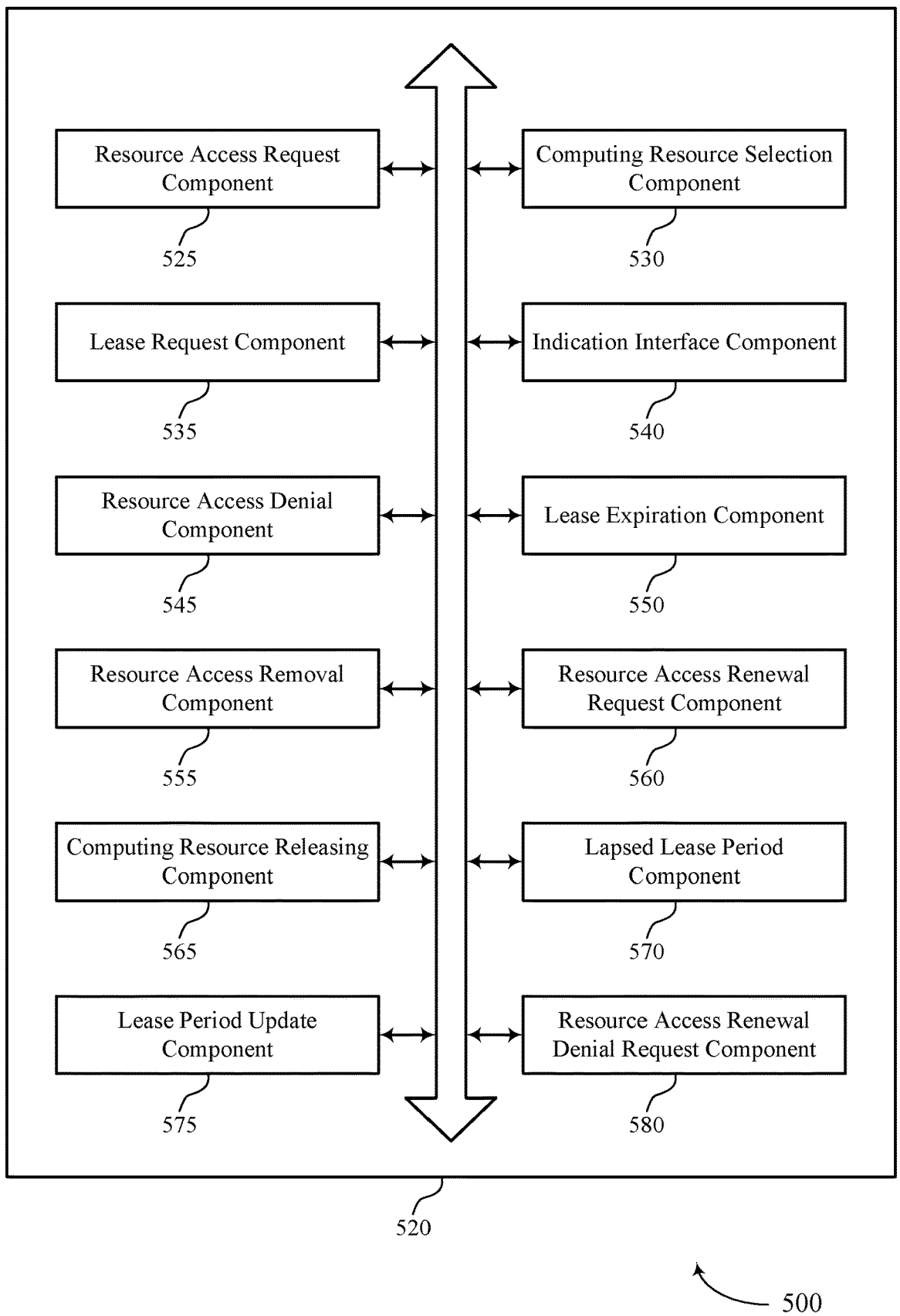
FIG. 5 illustrates a block diagram of a computing resource manager that supports leasing a virtual computing system infrastructure in accordance with aspects of the present disclosure.

FIG. 5 illustrates a block diagram 500 of a computing resource manager 520 that supports leasing a virtual computing system infrastructure in accordance with aspects of the present disclosure. The computing resource manager 520 may be an example of aspects of a computing resource manager or a computing resource manager 420, or both, as described herein. The computing resource manager 520, or various components thereof, may be an example of means for performing various aspects of leasing a virtual computing system infrastructure as described herein. For example, the computing resource manager 520 may include a resource access request component 525, a computing resource selection component 530, a lease request component 535, an indication interface component 540, a resource access denial component 545, a lease expiration component 550, a resource access removal component 555, a resource access renewal request component 560, a computing resource releasing component 565, a lapsed lease period component 570, a lease period update component 575, a resource access renewal denial request component 580, or any combination thereof. Each of these components may communicate, directly or indirectly, with one another (e.g., via one or more buses).

The computing resource manager 520 may support data processing in accordance with examples as disclosed herein. The resource access request component 525 may be used for receiving, from a user and at a user interface supported by a computing resource management service, a resource access request for use of one of a set of multiple resources managed by the computing resource management service. The computing resource selection component 530 may be used for selecting a computing resource from a set of available resources of the set of multiple resources, the set of multiple resources including the set of available resources and set of resources that are designated as leased by another user. The lease request component 535 may be used for transmitting, to the selected computing resource, a lease request that is configured to modify an access control parameter to allow the user access to the selected computing resource during a lease period and restrict other users from accessing the selected computing resource during the lease period. The indication interface component 540 may be used for transmitting, to the user via the user interface, an indication of the selected computing resource and the lease period.

In some examples, the resource access request component 525 may be used for receiving, from a second user and at the user interface supported by the computing resource management service, a resource access request for use of the selected computing resource. In some examples, the resource access denial component 545 may be used for transmitting, to the second user via the user interface, an indication that the selected computing resource is leased for the lease period.

In some examples, the lease expiration component 550 may be used for transmitting, to the user via the user interface, an indication of expiration of the lease period for the selected computing resource. In some examples, the resource access removal component 555 may be used for transmitting, to the selected computing resource based on expiration of the lease period, a request that is configured to modify the access control parameter to deny the user access to the selected computing resource.

In some examples, the lease period includes a pre-configured duration.

In some examples, the resource access renewal request component 560 may be used for receiving, from the user via the user interface during the lease period, a request to renew the lease period of the selected computing resource.

In some examples, the lapsed lease period component 570 may be used for determining, based on receiving the request to renew the lease period, that a pre-configured portion of the lease period has lapsed for the selected computing resource. In some examples, the lease period update component 575 may be used for updating the lease period for the selected computing resource based on determining that the pre-configured portion of the lease period has lapsed.

In some examples, the lapsed lease period component 570 may be used for determining, based on receiving the request to renew the lease period, that a pre-configured portion of the lease period has not lapsed for the selected computing resource. In some examples, the resource access renewal denial request component 580 may be used for transmitting, to the user via the user interface, an indication that the request to renew the lease period is denied based on determining that the pre-configured portion of the lease period has not lapsed.

In some examples, the computing resource releasing component 565 may be used for receiving, from the user via the user interface, an indication to release the selected computing resource prior to an expiration of the lease period. In some examples, the resource access removal component 555 may be used for transmitting, to the selected computing resource based on receiving the indication to release the selected computing resource, a request that is configured to modify the access control parameter to deny the user access to the selected computing resource.

In some examples, to support selecting the computing resource, the computing resource selection component 530 may be used for randomly selecting the computing resource from the set of available resources.

In some examples, to support receiving the resource access request, the computing resource selection component 530 may be used for receiving, from the user via the user interface, an indication of the computing resource of the set of available resources, the computing resource being selected based on receiving the indication.

In some examples, each resource of the set of multiple resources includes a respective software stack and hardware stack.

Figure 6:
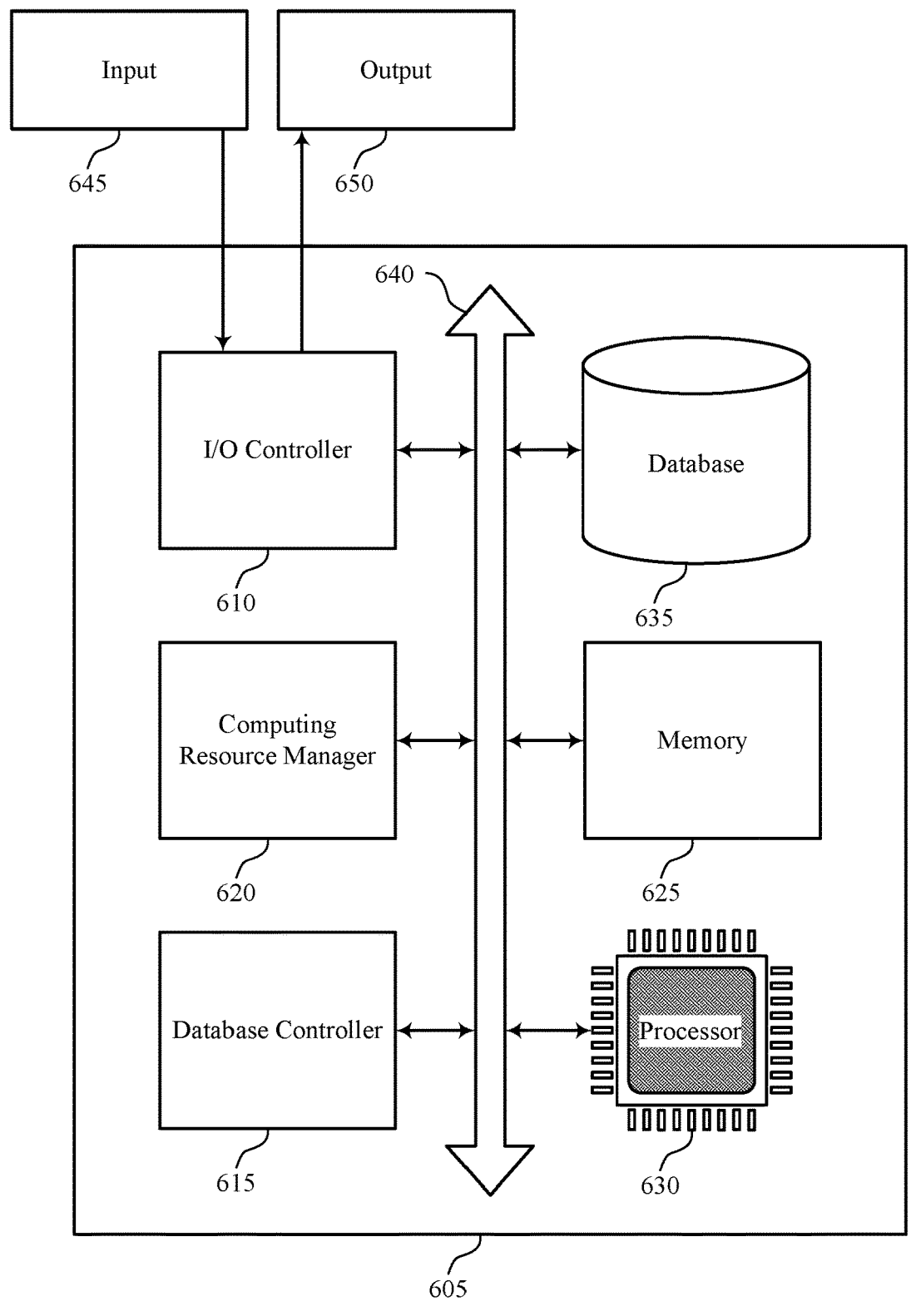
FIG. 6 illustrates a diagram of a system including a device that supports leasing a virtual computing system infrastructure in accordance with aspects of the present disclosure.

FIG. 6 illustrates a diagram of a system 600 including a device 605 that supports leasing a virtual computing system infrastructure in accordance with aspects of the present disclosure. The device 605 may be an example of or include the components of a device 405 as described herein. The device 605 may include components for bi-directional data communications including components for transmitting and receiving communications, such as a computing resource manager 620, an I/O controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause the processor 630 to perform various functions described herein. In some cases, the memory 625 may contain, among other things, a BIOS which may control basic hardware or software operation such as the interaction with peripheral components or devices.

The processor 630 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting leasing a virtual computing system infrastructure).

The computing resource manager 620 may support data processing in accordance with examples as disclosed herein. For example, the computing resource manager 620 may be used for receiving, from a user and at a user interface supported by a computing resource management service, a resource access request for use of one of a set of multiple resources managed by the computing resource management service. The computing resource manager 620 may be used for selecting a computing resource from a set of available resources of the set of multiple resources, the set of multiple resources including the set of available resources and set of resources that are designated as leased by another user. The computing resource manager 620 may be used for transmitting, to the selected computing resource, a lease request that is configured to modify an access control parameter to allow the user access to the selected computing resource during a lease period and restrict other users from accessing the selected computing resource during the lease period. The computing resource manager 620 may be used for transmitting, to the user via the user interface, an indication of the selected computing resource and the lease period.

By including or configuring the computing resource manager 620 in accordance with examples as described herein, the device 605 may support techniques for leasing a virtual computing system infrastructure may allow for an improved user experience, more efficient utilization of communication resources, and an improved coordination between devices.

Figure 7:
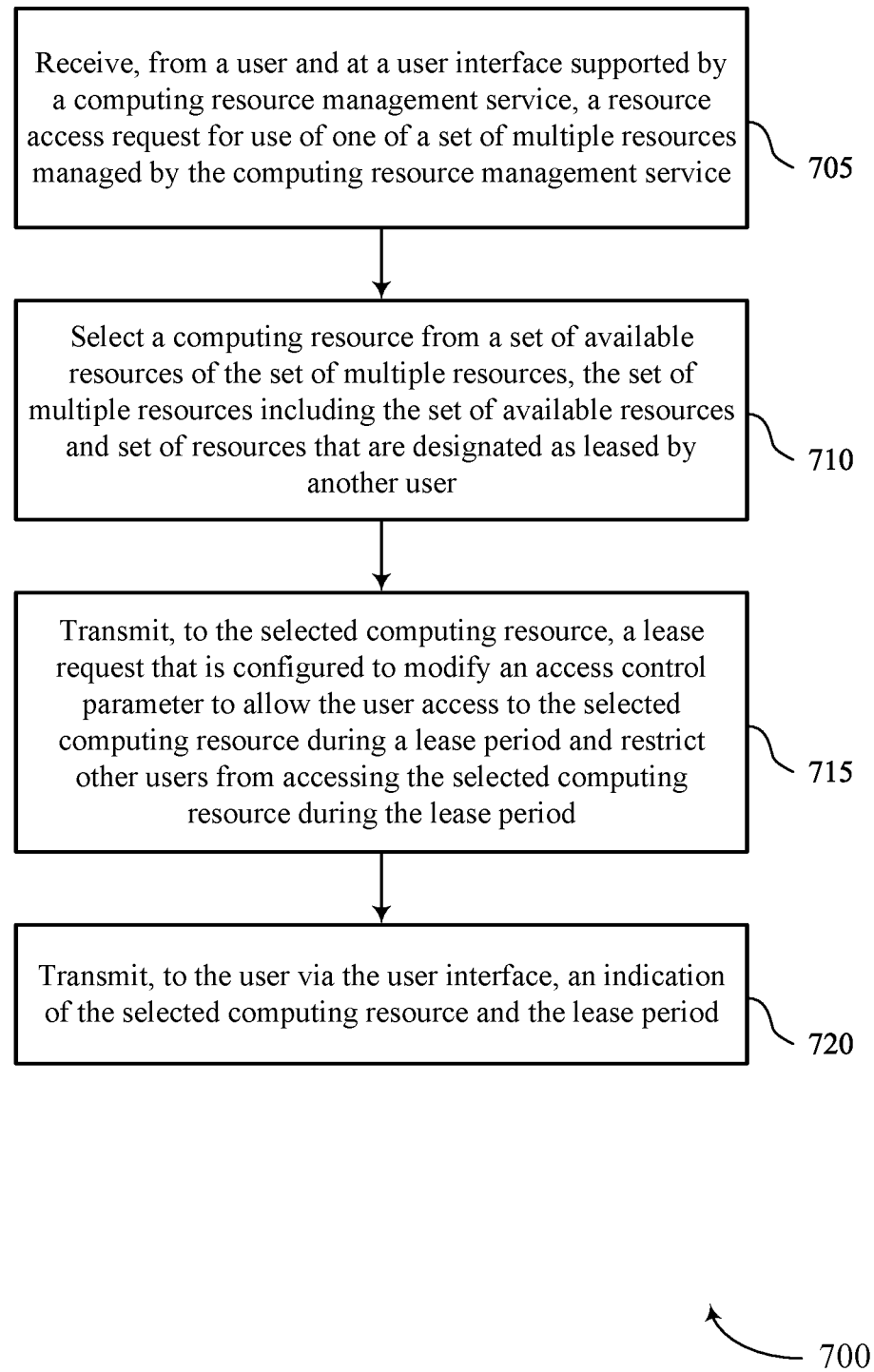
FIGS. 7 through 11 illustrate flowcharts showing methods that support leasing a virtual computing system infrastructure in accordance with aspects of the present disclosure.

FIG. 7 illustrates a flowchart showing a method 700 that supports leasing a virtual computing system infrastructure in accordance with aspects of the present disclosure. The operations of the method 700 may be implemented by a server or its components as described herein. For example, the operations of the method 700 may be performed by a server as described with reference to FIGS. 1 through 6. In some examples, a server may execute a set of instructions to control the functional elements of the server to perform the described functions. Additionally, or alternatively, the server may perform aspects of the described functions using special-purpose hardware.

At 705, the method may include receiving, from a user and at a user interface supported by a computing resource management service, a resource access request for use of one of a set of multiple resources managed by the computing resource management service. The operations of 705 may be performed in accordance with examples as disclosed herein. In some examples, aspects of the operations of 705 may be performed by a resource access request component 525 as described with reference to FIG. 5.

At 710, the method may include selecting a computing resource from a set of available resources of the set of multiple resources, the set of multiple resources including the set of available resources and set of resources that are designated as leased by another user. The operations of 710 may be performed in accordance with examples as disclosed herein. In some examples, aspects of the operations of 710 may be performed by a computing resource selection component 530 as described with reference to FIG. 5.

At 715, the method may include transmitting, to the selected computing resource, a lease request that is configured to modify an access control parameter to allow the user access to the selected computing resource during a lease period and restrict other users from accessing the selected computing resource during the lease period. The operations of 715 may be performed in accordance with examples as disclosed herein. In some examples, aspects of the operations of 715 may be performed by a lease request component 535 as described with reference to FIG. 5.

At 720, the method may include transmitting, to the user via the user interface, an indication of the selected computing resource and the lease period. The operations of 720 may be performed in accordance with examples as disclosed herein. In some examples, aspects of the operations of 720 may be performed by an indication interface component 540 as described with reference to FIG. 5.

Figure 8:
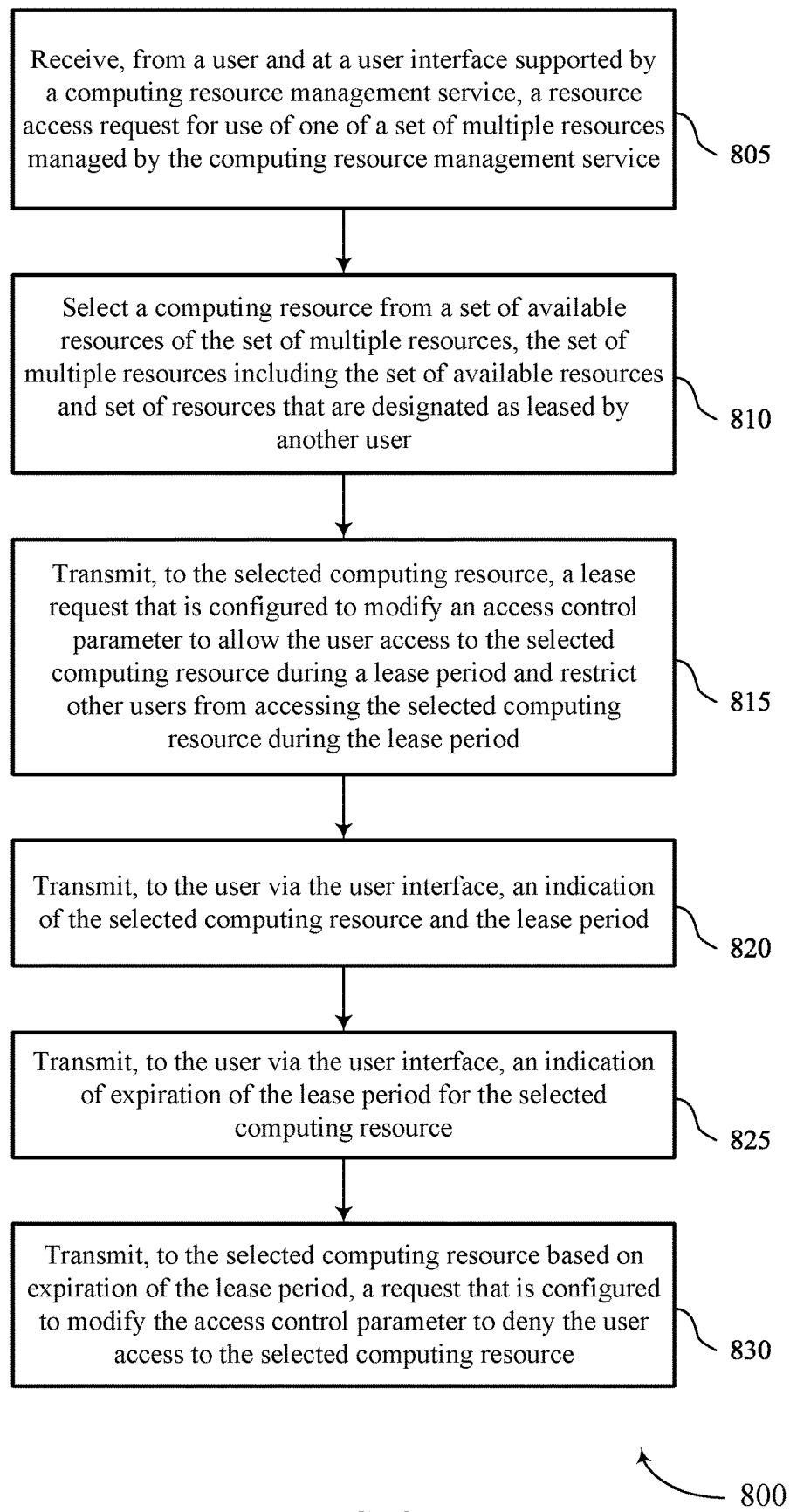

FIG. 8 illustrates a flowchart showing a method 800 that supports leasing a virtual computing system infrastructure in accordance with aspects of the present disclosure. The operations of the method 800 may be implemented by a server or its components as described herein. For example, the operations of the method 800 may be performed by a server as described with reference to FIGS. 1 through 6. In some examples, a server may execute a set of instructions to control the functional elements of the server to perform the described functions. Additionally, or alternatively, the server may perform aspects of the described functions using special-purpose hardware.

At 805, the method may include receiving, from a user and at a user interface supported by a computing resource management service, a resource access request for use of one of a set of multiple resources managed by the computing resource management service. The operations of 805 may be performed in accordance with examples as disclosed herein. In some examples, aspects of the operations of 805 may be performed by a resource access request component 525 as described with reference to FIG. 5.

At 810, the method may include selecting a computing resource from a set of available resources of the set of multiple resources, the set of multiple resources including the set of available resources and set of resources that are designated as leased by another user. The operations of 810 may be performed in accordance with examples as disclosed herein. In some examples, aspects of the operations of 810 may be performed by a computing resource selection component 530 as described with reference to FIG. 5.

At 815, the method may include transmitting, to the selected computing resource, a lease request that is configured to modify an access control parameter to allow the user access to the selected computing resource during a lease period and restrict other users from accessing the selected computing resource during the lease period. The operations of 815 may be performed in accordance with examples as disclosed herein. In some examples, aspects of the operations of 815 may be performed by a lease request component 535 as described with reference to FIG. 5.

At 820, the method may include transmitting, to the user via the user interface, an indication of the selected computing resource and the lease period. The operations of 820 may be performed in accordance with examples as disclosed herein. In some examples, aspects of the operations of 820 may be performed by an indication interface component 540 as described with reference to FIG. 5.

At 825, the method may include transmitting, to the user via the user interface, an indication of expiration of the lease period for the selected computing resource. The operations of 825 may be performed in accordance with examples as disclosed herein. In some examples, aspects of the operations of 825 may be performed by a lease expiration component 550 as described with reference to FIG. 5.

At 830, the method may include transmitting, to the selected computing resource based on expiration of the lease period, a request that is configured to modify the access control parameter to deny the user access to the selected computing resource. The operations of 830 may be performed in accordance with examples as disclosed herein. In some examples, aspects of the operations of 830 may be performed by a resource access removal component 555 as described with reference to FIG. 5.

Figure 9:
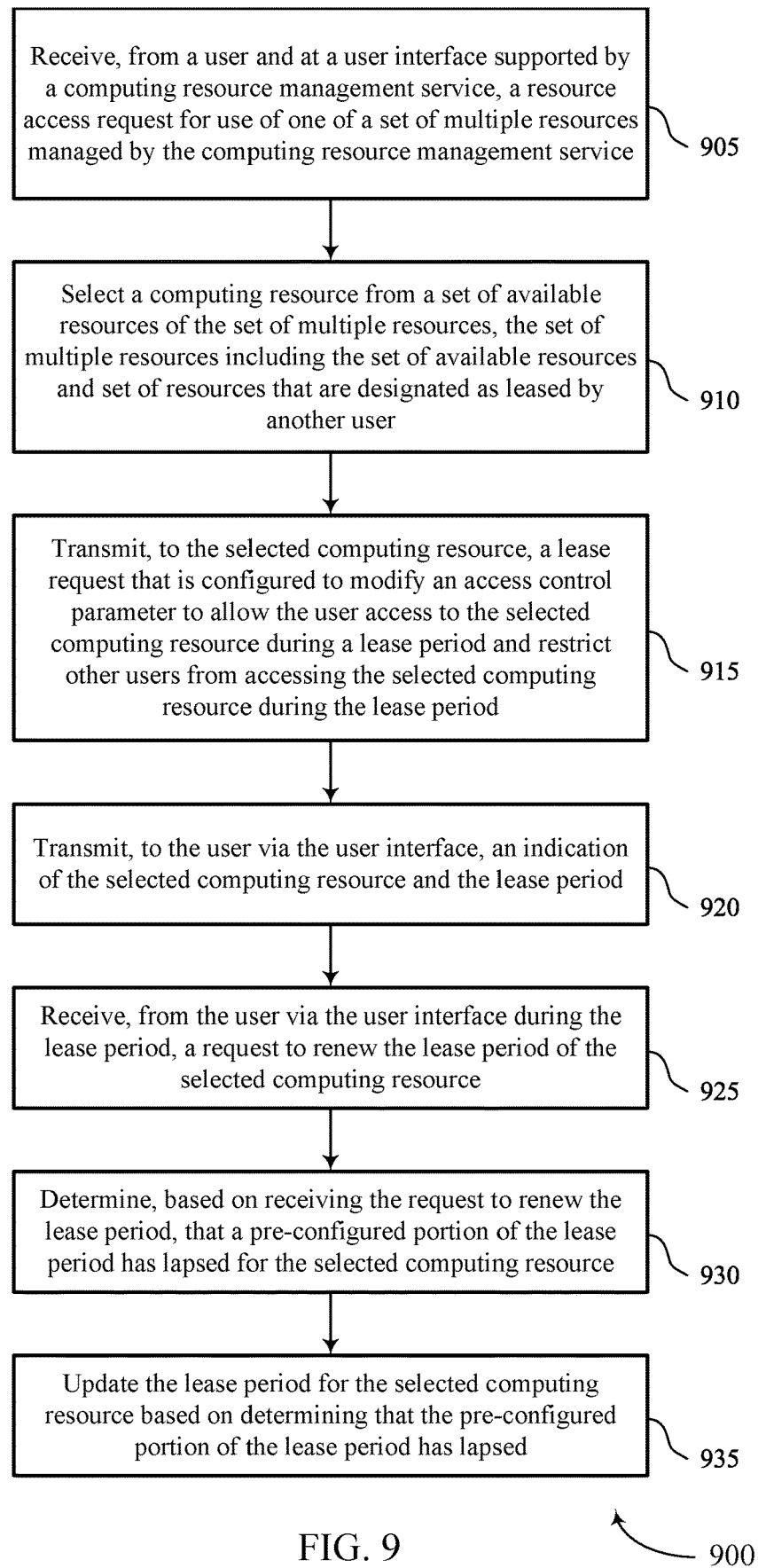

FIG. 9 illustrates a flowchart showing a method 900 that supports leasing a virtual computing system infrastructure in accordance with aspects of the present disclosure. The operations of the method 900 may be implemented by a server or its components as described herein. For example, the operations of the method 900 may be performed by a server as described with reference to FIGS. 1 through 6. In some examples, a server may execute a set of instructions to control the functional elements of the server to perform the described functions. Additionally, or alternatively, the server may perform aspects of the described functions using special-purpose hardware.

At 905, the method may include receiving, from a user and at a user interface supported by a computing resource management service, a resource access request for use of one of a set of multiple resources managed by the computing resource management service. The operations of 905 may be performed in accordance with examples as disclosed herein. In some examples, aspects of the operations of 905 may be performed by a resource access request component 525 as described with reference to FIG. 5.

At 910, the method may include selecting a computing resource from a set of available resources of the set of multiple resources, the set of multiple resources including the set of available resources and set of resources that are designated as leased by another user. The operations of 910 may be performed in accordance with examples as disclosed herein. In some examples, aspects of the operations of 910 may be performed by a computing resource selection component 530 as described with reference to FIG. 5.

At 915, the method may include transmitting, to the selected computing resource, a lease request that is configured to modify an access control parameter to allow the user access to the selected computing resource during a lease period and restrict other users from accessing the selected computing resource during the lease period. The operations of 915 may be performed in accordance with examples as disclosed herein. In some examples, aspects of the operations of 915 may be performed by a lease request component 535 as described with reference to FIG. 5.

At 920, the method may include transmitting, to the user via the user interface, an indication of the selected computing resource and the lease period. The operations of 920 may be performed in accordance with examples as disclosed herein. In some examples, aspects of the operations of 920 may be performed by an indication interface component 540 as described with reference to FIG. 5.

At 925, the method may include receiving, from the user via the user interface during the lease period, a request to renew the lease period of the selected computing resource. The operations of 925 may be performed in accordance with examples as disclosed herein. In some examples, aspects of the operations of 925 may be performed by a resource access renewal request component 560 as described with reference to FIG. 5.

At 930, the method may include determining, based on receiving the request to renew the lease period, that a pre-configured portion of the lease period has lapsed for the selected computing resource. The operations of 930 may be performed in accordance with examples as disclosed herein. In some examples, aspects of the operations of 930 may be performed by a lapsed lease period component 570 as described with reference to FIG. 5.

At 935, the method may include updating the lease period for the selected computing resource based on determining that the pre-configured portion of the lease period has lapsed. The operations of 935 may be performed in accordance with examples as disclosed herein. In some examples, aspects of the operations of 935 may be performed by a lease period update component 575 as described with reference to FIG. 5.

Figure 10:
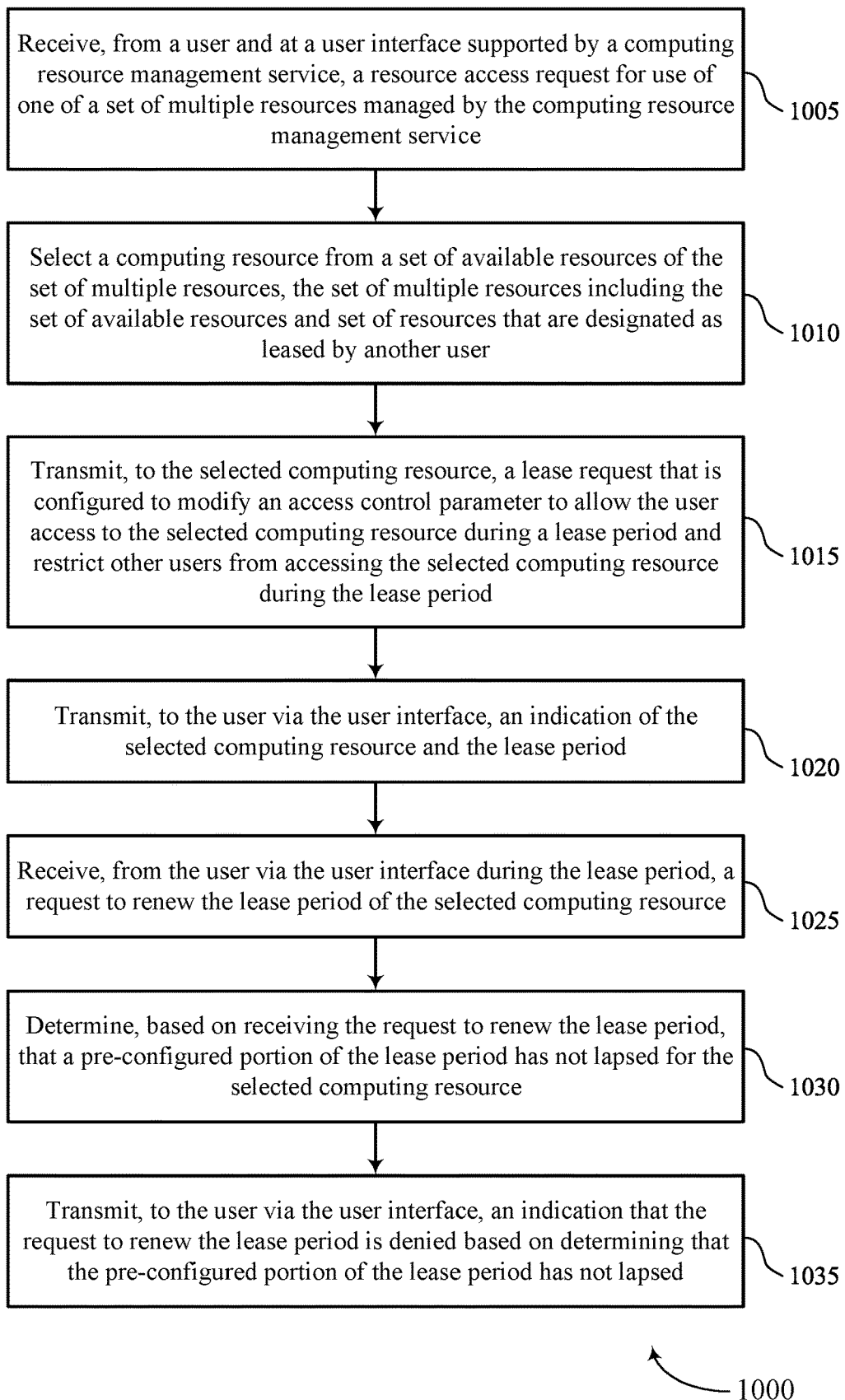

FIG. 10 illustrates a flowchart showing a method 1000 that supports leasing a virtual computing system infrastructure in accordance with aspects of the present disclosure. The operations of the method 1000 may be implemented by a server or its components as described herein. For example, the operations of the method 1000 may be performed by a server as described with reference to FIGS. 1 through 6. In some examples, a server may execute a set of instructions to control the functional elements of the server to perform the described functions. Additionally, or alternatively, the server may perform aspects of the described functions using special-purpose hardware.

At 1005, the method may include receiving, from a user and at a user interface supported by a computing resource management service, a resource access request for use of one of a set of multiple resources managed by the computing resource management service. The operations of 1005 may be performed in accordance with examples as disclosed herein. In some examples, aspects of the operations of 1005 may be performed by a resource access request component 525 as described with reference to FIG. 5.

At 1010, the method may include selecting a computing resource from a set of available resources of the set of multiple resources, the set of multiple resources including the set of available resources and set of resources that are designated as leased by another user. The operations of 1010 may be performed in accordance with examples as disclosed herein. In some examples, aspects of the operations of 1010 may be performed by a computing resource selection component 530 as described with reference to FIG. 5.

At 1015, the method may include transmitting, to the selected computing resource, a lease request that is configured to modify an access control parameter to allow the user access to the selected computing resource during a lease period and restrict other users from accessing the selected computing resource during the lease period. The operations of 1015 may be performed in accordance with examples as disclosed herein. In some examples, aspects of the operations of 1015 may be performed by a lease request component 535 as described with reference to FIG. 5.

At 1020, the method may include transmitting, to the user via the user interface, an indication of the selected computing resource and the lease period. The operations of 1020 may be performed in accordance with examples as disclosed herein. In some examples, aspects of the operations of 1020 may be performed by an indication interface component 540 as described with reference to FIG. 5.

At 1025, the method may include receiving, from the user via the user interface during the lease period, a request to renew the lease period of the selected computing resource. The operations of 1025 may be performed in accordance with examples as disclosed herein. In some examples, aspects of the operations of 1025 may be performed by a resource access renewal request component 560 as described with reference to FIG. 5.

At 1030, the method may include determining, based on receiving the request to renew the lease period, that a pre-configured portion of the lease period has not lapsed for the selected computing resource. The operations of 1030 may be performed in accordance with examples as disclosed herein. In some examples, aspects of the operations of 1030 may be performed by a lapsed lease period component 570 as described with reference to FIG. 5.

At 1035, the method may include transmitting, to the user via the user interface, an indication that the request to renew the lease period is denied based on determining that the pre-configured portion of the lease period has not lapsed. The operations of 1035 may be performed in accordance with examples as disclosed herein. In some examples, aspects of the operations of 1035 may be performed by a resource access renewal denial request component 580 as described with reference to FIG. 5.

Figure 11:
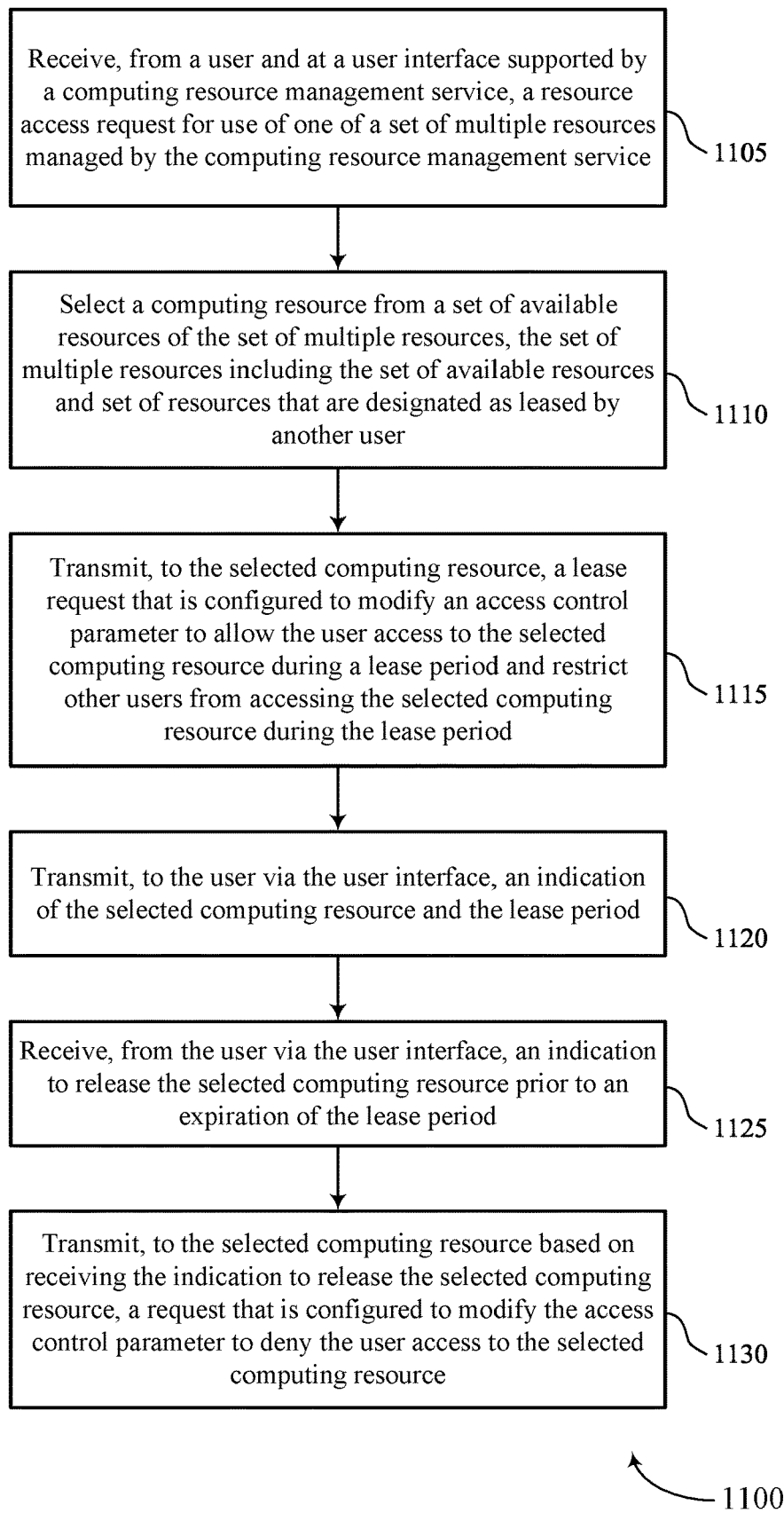

FIG. 11 illustrates a flowchart showing a method 1100 that supports leasing a virtual computing system infrastructure in accordance with aspects of the present disclosure. The operations of the method 1100 may be implemented by a server or its components as described herein. For example, the operations of the method 1100 may be performed by a server as described with reference to FIGS. 1 through 6. In some examples, a server may execute a set of instructions to control the functional elements of the server to perform the described functions. Additionally, or alternatively, the server may perform aspects of the described functions using special-purpose hardware.

At 1105, the method may include receiving, from a user and at a user interface supported by a computing resource management service, a resource access request for use of one of a set of multiple resources managed by the computing resource management service. The operations of 1105 may be performed in accordance with examples as disclosed herein. In some examples, aspects of the operations of 1105 may be performed by a resource access request component 525 as described with reference to FIG. 5.

At 1110, the method may include selecting a computing resource from a set of available resources of the set of multiple resources, the set of multiple resources including the set of available resources and set of resources that are designated as leased by another user. The operations of 1110 may be performed in accordance with examples as disclosed herein. In some examples, aspects of the operations of 1110 may be performed by a computing resource selection component 530 as described with reference to FIG. 5.

At 1115, the method may include transmitting, to the selected computing resource, a lease request that is configured to modify an access control parameter to allow the user access to the selected computing resource during a lease period and restrict other users from accessing the selected computing resource during the lease period. The operations of 1115 may be performed in accordance with examples as disclosed herein. In some examples, aspects of the operations of 1115 may be performed by a lease request component 535 as described with reference to FIG. 5.

At 1120, the method may include transmitting, to the user via the user interface, an indication of the selected computing resource and the lease period. The operations of 1120 may be performed in accordance with examples as disclosed herein. In some examples, aspects of the operations of 1120 may be performed by an indication interface component 540 as described with reference to FIG. 5.

At 1125, the method may include receiving, from the user via the user interface, an indication to release the selected computing resource prior to an expiration of the lease period. The operations of 1125 may be performed in accordance with examples as disclosed herein. In some examples, aspects of the operations of 1125 may be performed by a computing resource releasing component 565 as described with reference to FIG. 5.

At 1130, the method may include transmitting, to the selected computing resource based on receiving the indication to release the selected computing resource, a request that is configured to modify the access control parameter to deny the user access to the selected computing resource. The operations of 1130 may be performed in accordance with examples as disclosed herein. In some examples, aspects of the operations of 1130 may be performed by a resource access removal component 555 as described with reference to FIG. 5.

A method for data processing is described. The method may include receiving, from a user and at a user interface supported by a computing resource management service, a resource access request for use of one of a set of multiple resources managed by the computing resource management service, selecting a computing resource from a set of available resources of the set of multiple resources, the set of multiple resources including the set of available resources and set of resources that are designated as leased by another user, transmitting, to the selected computing resource, a lease request that is configured to modify an access control parameter to allow the user access to the selected computing resource during a lease period and restrict other users from accessing the selected computing resource during the lease period, and transmitting, to the user via the user interface, an indication of the selected computing resource and the lease period.

An apparatus for data processing is described. The apparatus may include a processor, memory coupled with the processor, and instructions stored in the memory. The instructions may be executable by the processor to cause the apparatus to receive, from a user and at a user interface supported by a computing resource management service, a resource access request for use of one of a set of multiple resources managed by the computing resource management service, select a computing resource from a set of available resources of the set of multiple resources, the set of multiple resources including the set of available resources and set of resources that are designated as leased by another user, transmit, to the selected computing resource, a lease request that is configured to modify an access control parameter to allow the user access to the selected computing resource during a lease period and restrict other users from accessing the selected computing resource during the lease period, and transmit, to the user via the user interface, an indication of the selected computing resource and the lease period.

Another apparatus for data processing is described. The apparatus may include means for receiving, from a user and at a user interface supported by a computing resource management service, a resource access request for use of one of a set of multiple resources managed by the computing resource management service, means for selecting a computing resource from a set of available resources of the set of multiple resources, the set of multiple resources including the set of available resources and set of resources that are designated as leased by another user, means for transmitting, to the selected computing resource, a lease request that is configured to modify an access control parameter to allow the user access to the selected computing resource during a lease period and restrict other users from accessing the selected computing resource during the lease period, and means for transmitting, to the user via the user interface, an indication of the selected computing resource and the lease period.

A non-transitory computer-readable medium storing code for data processing is described. The code may include instructions executable by a processor to receive, from a user and at a user interface supported by a computing resource management service, a resource access request for use of one of a set of multiple resources managed by the computing resource management service, select a computing resource from a set of available resources of the set of multiple resources, the set of multiple resources including the set of available resources and set of resources that are designated as leased by another user, transmit, to the selected computing resource, a lease request that is configured to modify an access control parameter to allow the user access to the selected computing resource during a lease period and restrict other users from accessing the selected computing resource during the lease period, and transmit, to the user via the user interface, an indication of the selected computing resource and the lease period.

Some examples of the method, apparatuses, and non-transitory computer-readable medium described herein may further include operations, features, means, or instructions for receiving, from a second user and at the user interface supported by the computing resource management service, a resource access request for use of the selected computing resource and transmitting, to the second user via the user interface, an indication that the selected computing resource may be leased for the lease period.

Some examples of the method, apparatuses, and non-transitory computer-readable medium described herein may further include operations, features, means, or instructions for transmitting, to the user via the user interface, an indication of expiration of the lease period for the selected computing resource and transmitting, to the selected computing resource based on expiration of the lease period, a request that may be configured to modify the access control parameter to deny the user access to the selected computing resource.

In some examples of the method, apparatuses, and non-transitory computer-readable medium described herein, the lease period includes a pre-configured duration.

Some examples of the method, apparatuses, and non-transitory computer-readable medium described herein may further include operations, features, means, or instructions for receiving, from the user via the user interface during the lease period, a request to renew the lease period of the selected computing resource.

Some examples of the method, apparatuses, and non-transitory computer-readable medium described herein may further include operations, features, means, or instructions for determining, based on receiving the request to renew the lease period, that a pre-configured portion of the lease period may have lapsed for the selected computing resource and updating the lease period for the selected computing resource based on determining that the pre-configured portion of the lease period may have lapsed.

Some examples of the method, apparatuses, and non-transitory computer-readable medium described herein may further include operations, features, means, or instructions for determining, based on receiving the request to renew the lease period, that a pre-configured portion of the lease period may have not lapsed for the selected computing resource and transmitting, to the user via the user interface, an indication that the request to renew the lease period may be denied based on determining that the pre-configured portion of the lease period may have not lapsed.

Some examples of the method, apparatuses, and non-transitory computer-readable medium described herein may further include operations, features, means, or instructions for receiving, from the user via the user interface, an indication to release the selected computing resource prior to an expiration of the lease period and transmitting, to the selected computing resource based on receiving the indication to release the selected computing resource, a request that may be configured to modify the access control parameter to deny the user access to the selected computing resource.

In some examples of the method, apparatuses, and non-transitory computer-readable medium described herein, selecting the computing resource may include operations, features, means, or instructions for randomly selecting the computing resource from the set of available resources.

In some examples of the method, apparatuses, and non-transitory computer-readable medium described herein, receiving the resource access request may include operations, features, means, or instructions for receiving, from the user via the user interface, an indication of the computing resource of the set of available resources, the computing resource being selected based on receiving the indication.

In some examples of the method, apparatuses, and non-transitory computer-readable medium described herein, each resource of the set of multiple resources includes a respective software stack and hardware stack.

The following provides an overview of aspects of the present disclosure:

Aspect 1: A method for data processing, comprising: receiving, from a user and at a user interface supported by a computing resource management service, a resource access request for use of one of a plurality of resources managed by the computing resource management service; selecting a computing resource from a set of available resources of the plurality of resources, the plurality of resources including the set of available resources and set of resources that are designated as leased by another user; transmitting, to the selected computing resource, a lease request that is configured to modify an access control parameter to allow the user access to the selected computing resource during a lease period and restrict other users from accessing the selected computing resource during the lease period; and transmitting, to the user via the user interface, an indication of the selected computing resource and the lease period.

Aspect 2: The method of aspect 1, further comprising: receiving, from a second user and at the user interface supported by the computing resource management service, a resource access request for use of the selected computing resource; transmitting, to the second user via the user interface, an indication that the selected computing resource is leased for the lease period.

Aspect 3: The method of aspects 1, further comprising: transmitting, to the user via the user interface, an indication of expiration of the lease period for the selected computing resource; and transmitting, to the selected computing resource based at least in part on expiration of the lease period, a request that is configured to modify the access control parameter to deny the user access to the selected computing resource.

Aspect 4: The method of any of aspects 1 through 3, wherein the lease period comprises a pre-configured duration.

Aspect 5: The method of any of aspects 1 through 4, further comprising: receiving, from the user via the user interface during the lease period, a request to renew the lease period of the selected computing resource.

Aspect 6: The method of aspect 5, further comprising: determining, based at least in part on receiving the request to renew the lease period, that a pre-configured portion of the lease period has lapsed for the selected computing resource; and updating the lease period for the selected computing resource based at least in part on determining that the pre-configured portion of the lease period has lapsed.

Aspect 7: The method of any of aspects 5 through 6, further comprising: determining, based at least in part on receiving the request to renew the lease period, that a pre-configured portion of the lease period has not lapsed for the selected computing resource; and transmitting, to the user via the user interface, an indication that the request to renew the lease period is denied based at least in part on determining that the pre-configured portion of the lease period has not lapsed.

Aspect 8: The method of any of aspects 1 through 4, further comprising: receiving, from the user via the user interface, an indication to release the selected computing resource prior to an expiration of the lease period; and transmitting, to the selected computing resource based at least in part on receiving the indication to release the selected computing resource, a request that is configured to modify the access control parameter to deny the user access to the selected computing resource.

Aspect 9: The method of any of aspects 1 through 8, wherein selecting the computing resource comprises: randomly selecting the computing resource from the set of available resources.

Aspect 10: The method of any of aspects 1 through 9, wherein receiving the resource access request comprises: receiving, from the user via the user interface, an indication of the computing resource of the set of available resources, the computing resource being selected based at least in part on receiving the indication.

Aspect 11: The method of any of aspects 1 through 10, wherein each resource of the plurality of resources comprises a respective software stack and hardware stack.

Aspect 12: An apparatus for data processing, comprising a processor; memory coupled with the processor; and instructions stored in the memory and executable by the processor to cause the apparatus to perform a method of any of aspects 1 through 11.

Aspect 13: An apparatus for data processing, comprising at least one means for performing a method of any of aspects 1 through 11.

Aspect 14: A non-transitory computer-readable medium storing code for data processing, the code comprising instructions executable by a processor to perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing by a computing resource management service, comprising:
    receiving, from a user and at a user interface supported by the computing resource management service, a resource access request for use of one of a plurality of resources managed by the computing resource management service;
    selecting, at the computing resource management service a computing resource from a set of available resources of the plurality of resources, the plurality of resources including the set of available resources that are capable of being leased and set of resources that are designated as leased by another user;
    transmitting, to the selected computing resource, a lease request that is configured to modify an access control parameter to allow the user to access to the selected computing resource during a lease period and restrict other users from accessing the selected computing resource during the lease period;
    transmitting, to the user via the user interface, an indication of the selected computing resource and the lease period;
    receiving, from the user via the user interface during the lease period, a request to renew the lease period of the selected computing resource; and
    transmitting, to the user via the user interface, an indication of whether the computing resource management service renewed the lease period of the selected computing resource, the indication being based at least in part on whether a threshold duration of the lease period has lapsed.

2. The method of claim 1, further comprising:
    receiving, from a second user and at the user interface supported by the computing resource management service, a second resource access request for use of the selected computing resource; and
    transmitting, to the second user via the user interface, an indication that the selected computing resource is leased for the lease period.

3. The method of claim 2, wherein the user is associated with a first priority level and the second user is associated with a second priority level that is different from the first priority level, and the method further comprises:
    transmitting, to the second user via the user interface via the indication that the selected computing resource is leased, an indication that the selected computing resource is to be leased to the user based at least in part on the first priority level of the user being different than the second priority level of the second user, wherein modification of the access control parameter restricts the second user from accessing the selected computing resource during the lease period.

4. The method of claim 1, further comprising:
    transmitting, to the user via the user interface, an indication of expiration of the lease period for the selected computing resource; and
    transmitting, to the selected computing resource based at least in part on the expiration of the lease period, a request that is configured to modify the access control parameter to deny the user an access to the selected computing resource.

5. The method of claim 1, wherein the lease period comprises a pre-configured duration.

6. The method of claim 1, further comprising:
    determining, based at least in part on receiving the request to renew the lease period, that the threshold duration of the lease period has lapsed for the selected computing resource, wherein the threshold duration is a pre-configured portion of the lease period; and
    updating the lease period for the selected computing resource based at least in part on determining that the threshold duration of the lease period has lapsed, wherein the indication of whether the computing resource management service renewed the lease period is transmitted based at least in part on updating the lease period.

7. The method of claim 1, further comprising:
    determining, based at least in part on receiving the request to renew the lease period, that the threshold duration of the lease period has not lapsed for the selected computing resource, wherein the threshold duration is a pre-configured portion of the lease period; and
    transmitting, to the user via the user interface and via the indication of whether the computing resource management service renewed the lease period of the selected computing resource, an indication that the request to renew the lease period is denied based at least in part on determining that the threshold duration of the lease period has not lapsed.

8. The method of claim 1, further comprising:
receiving, from the user via the user interface, an indication to release the selected computing resource prior to an expiration of the lease period; and
transmitting, to the selected computing resource based at least in part on receiving the indication to release the selected computing resource, a request that is configured to modify the access control parameter to deny the user an access to the selected computing resource.

9. The method of claim 1, wherein selecting the computing resource comprises:
randomly selecting the computing resource from the set of available resources.

10. The method of claim 1, wherein receiving the resource access request comprises:
receiving, from the user via the user interface, an indication of the computing resource of the set of available resources, wherein the computing resource management service selects the computing resource based at least in part on receiving the indication.

11. The method of claim 1, wherein each resource of the plurality of resources comprises a respective software stack and hardware stack.

12. An apparatus for data processing, comprising:
a processor;
memory coupled with the processor; and
instructions stored in the memory and executable by the processor to cause the apparatus to:
receive, from a user and at a user interface supported by a computing resource management service, a resource access request for use of one of a plurality of resources managed by the computing resource management service;
select, at the computing resource management service, a computing resource from a set of available resources of the plurality of resources, the plurality of resources including the set of available resources that are capable of being leased and set of resources that are designated as leased by another user;
transmit, to the selected computing resource, a lease request that is configured to modify an access control parameter to allow the user to access to the selected computing resource during a lease period and restrict other users from accessing the selected computing resource during the lease period;
transmit, to the user via the user interface, an indication of the selected computing resource and the lease period;
receive, from the user via the user interface during the lease period, a request to renew the lease period of the selected computing resource; and
transmit, to the user via the user interface, an indication of whether the computing resource management service renewed the lease period of the selected computing resource, the indication being based at least in part on whether a threshold duration of the lease period has lapsed.

13. The apparatus of claim 12, wherein the instructions are further executable by the processor to cause the apparatus to:
receive, from a second user and at the user interface supported by the computing resource management service, a second resource access request for use of the selected computing resource; and
transmit, to the second user via the user interface, an indication that the selected computing resource is leased for the lease period.

14. The apparatus of claim 12, wherein the instructions are further executable by the processor to cause the apparatus to:
transmit, to the user via the user interface, an indication of expiration of the lease period for the selected computing resource; and
transmit, to the selected computing resource based at least in part on the expiration of the lease period, a request that is configured to modify the access control parameter to deny the user an access to the selected computing resource.

15. The apparatus of claim 12, wherein the lease period comprises a pre-configured duration.

16. The apparatus of claim 12, wherein the instructions are further executable by the processor to cause the apparatus to:
receive, from the user via the user interface, an indication to release the selected computing resource prior to an expiration of the lease period; and
transmit, to the selected computing resource based at least in part on receiving the indication to release the selected computing resource, a request that is configured to modify the access control parameter to deny the user an access to the selected computing resource.

17. A non-transitory computer-readable medium storing code for data processing, the code comprising instructions executable by a processor to:
receive, from a user and at a user interface supported by a computing resource management service, a resource access request for use of one of a plurality of resources managed by the computing resource management service;
select, at the computing resource management service, a computing resource from a set of available resources of the plurality of resources, the plurality of resources including the set of available resources that are capable of being leased and set of resources that are designated as leased by another user;
transmit, to the selected computing resource, a lease request that is configured to modify an access control parameter to allow the user to access to the selected computing resource during a lease period and restrict other users from accessing the selected computing resource during the lease period;
transmit, to the user via the user interface, an indication of the selected computing resource and the lease period;
receive, from the user via the user interface during the lease period, a request to renew the lease period of the selected computing resource; and
transmit, to the user via the user interface, an indication of whether the computing resource management service renewed the lease period of the selected computing resource, the indication being based at least in part on whether a threshold duration of the lease period has lapsed.

18. The non-transitory computer-readable medium of claim 17, wherein the instructions are further executable by the processor to:
receive, from a second user and at the user interface supported by the computing resource management service, a second resource access request for use of the selected computing resource; and
transmit, to the second user via the user interface, an indication that the selected computing resource is leased for the lease period.

19. The non-transitory computer-readable medium of claim 17, wherein the instructions are further executable by the processor to:
- transmit, to the user via the user interface, an indication of expiration of the lease period for the selected computing resource; and
- transmit, to the selected computing resource based at least in part on the expiration of the lease period, a request that is configured to modify the access control parameter to deny the user an access to the selected computing resource.

20. The non-transitory computer-readable medium of claim 17, wherein the instructions are further executable by the processor to:
- receive, from the user via the user interface, an indication to release the selected computing resource prior to an expiration of the lease period; and
- transmit, to the selected computing resource based at least in part on receiving the indication to release the selected computing resource, a request that is configured to modify the access control parameter to deny the user an access to the selected computing resource.

\* \* \* \* \*